(12) United States Patent
Matsumoto

(10) Patent No.: US 12,455,576 B2
(45) Date of Patent: Oct. 28, 2025

(54) INFORMATION DISPLAY SYSTEM AND INFORMATION DISPLAY METHOD

(71) Applicant: SHIMIZU CORPORATION, Tokyo (JP)

(72) Inventor: Takashi Matsumoto, Tokyo (JP)

(73) Assignee: SHIMIZU CORPORATION, Tokyo (JP)

( * ) Notice: Subject to any disclaimer, the term of this patent is extended or adjusted under 35 U.S.C. 154(b) by 461 days.

(21) Appl. No.: 17/603,480

(22) PCT Filed: Mar. 23, 2020

(86) PCT No.: PCT/JP2020/012670
§ 371 (c)(1),
(2) Date: Oct. 13, 2021

(87) PCT Pub. No.: WO2020/213346
PCT Pub. Date: Oct. 22, 2020

(65) Prior Publication Data
US 2022/0221869 A1    Jul. 14, 2022

(30) Foreign Application Priority Data
Apr. 16, 2019 (JP) .................................. 2019-077616

(51) Int. Cl.
*G05D 1/617* (2024.01)
*B60Q 1/50* (2006.01)
*G06V 20/58* (2022.01)

(52) U.S. Cl.
CPC ............. *G05D 1/617* (2024.01); *B60Q 1/507* (2022.05); *G06V 20/58* (2022.01); *B60Q 2400/50* (2013.01)

(58) Field of Classification Search
CPC ...... B60Q 1/507; B60Q 1/50; B60Q 2400/50; B60Q 2400/00; B60W 10/00;
(Continued)

(56) References Cited

U.S. PATENT DOCUMENTS 11,232,391 B1 * 1/2022 Baalke ................. G05D 1/0291
2005/0237346 A1 * 10/2005 Nishida ..................... G09G 5/00
345/697
(Continued)

FOREIGN PATENT DOCUMENTS

JP    2003231438 A    8/2003
JP    2007102488 A    4/2007
(Continued)

OTHER PUBLICATIONS

International Search Report issued in corresponding PCT Application No. PCT/JP2020/012670, Jun. 16, 2020.
(Continued)

*Primary Examiner* — Christian Chace
*Assistant Examiner* — Nicholas Stryker
(74) *Attorney, Agent, or Firm* — Hoffmann & Baron, LLP

(57) ABSTRACT

An information display system including a status determination unit configured to acquire a distribution status based on a detection result of positions of objects to be avoided in a target area, the objects including one or more obstacles, one or more vehicles, one or more persons, one or more groups of persons, or combinations thereof, the distribution status of the objects capable of varying based on movement of the objects, a route generation unit configured to determine a gap between the plurality of objects through which a vehicle is capable of passing based on the distribution status of the plurality of objects as acquired, the route generation unit further configured to generate a scheduled route on which the vehicle is capable of traveling based on the gap between the plurality of objects as determined, and a device configured to display the scheduled route on a floor of the target area.

10 Claims, 7 Drawing Sheets

(58) Field of Classification Search
CPC ....... B60W 60/00276; B60W 2300/00; B60W 2530/213; B60W 2540/041; B60W 2540/049; B60W 2552/00; B60W 2556/65; B60W 2710/00; B60W 2720/406; B60W 2754/00; B60W 2900/00; G05D 1/0214; G05D 2201/0211; G05D 1/0282; G06V 20/58; G06V 20/53; G08G 1/01; G08G 1/16; G08G 5/22; G08G 5/23; G08G 5/24; G08G 5/27

See application file for complete search history.

(56) References Cited

U.S. PATENT DOCUMENTS

| | | | |
|---|---|---|---|
| 2009/0213458 A1* | 8/2009 | Stewart | B32B 17/10045 359/460 |
| 2015/0154863 A1* | 6/2015 | Fossier | G09F 13/12 340/907 |
| 2019/0106291 A1* | 4/2019 | Choi | B66B 3/002 |
| 2019/0163196 A1* | 5/2019 | Janssen | B60Q 1/54 |
| 2019/0176333 A1* | 6/2019 | Hager, IV | G05D 1/0214 |
| 2019/0193629 A1* | 6/2019 | Zevenbergen | B60Q 1/543 |
| 2019/0248623 A1 | 8/2019 | Yoshizawa et al. | |
| 2020/0035090 A1* | 1/2020 | Fossier | G08G 1/04 |
| 2020/0047337 A1* | 2/2020 | Williams | B25J 9/1676 |
| 2021/0026371 A1* | 1/2021 | Sugiyama | G05D 1/0297 |

FOREIGN PATENT DOCUMENTS

| | | |
|---|---|---|
| JP | 2009110495 A | 5/2009 |
| JP | 2009123045 A | 6/2009 |
| JP | 2009248598 A | 10/2009 |
| JP | 2017534091 A | 11/2017 |
| JP | 2018070377 A | 5/2018 |
| JP | 2019000940 A | 1/2019 |
| JP | 2020131897 A | 8/2020 |
| WO | 2009063318 A1 | 5/2009 |
| WO | 2011089885 A1 | 7/2011 |
| WO | 2014068975 A1 | 5/2014 |
| WO | 2018066054 A1 | 4/2018 |
| WO | 2018078681 A1 | 5/2018 |
| WO | WO-2020148056 A1 * | 7/2020 ............. B60K 35/00 |

OTHER PUBLICATIONS

Japanese Notice of Allowance issued in corresponding Application No. 2019-077616 mailed Oct. 4, 2022.
Japanese Office Action issued in corresponding Japanese Application No. 2019-077616, mailed Jul. 26, 2022.

* cited by examiner

INFORMATION DISPLAY SYSTEM AND INFORMATION DISPLAY METHOD

CROSS-REFERENCE TO RELATED APPLICATIONS

This application is the U.S. National Phase Application of International Application No. PCT/JP2020/012670, filed on Mar. 23, 2020, and asserts priority to Japanese Patent Application No. 2019-077616, filed on Apr. 16, 2019, all of which are hereby incorporated by reference in their entirety.

TECHNICAL FIELD

The present invention relates to an information display system and an information display method.

BACKGROUND ART

The technology of autonomous vehicles and autonomous driving robots (hereinafter referred to as autonomous vehicles) has advanced, and these autonomous vehicles have begun to be introduced in various places in block buildings, showing signs of widespread use. These autonomous vehicles are expected to travel in a state where pedestrian vehicles coexist, such as in buildings, underground passages, on sidewalks, and on roads with non-separated pedestrian vehicles. Under such circumstances, technology and interaction are required to drive smoothly even in a crowded status with a large number of people. For example, in the past, a driver has been driving while alerting a pedestrian by a horn in an automobile, a bell in a bicycle, an alert sound in an airport cart, or the like.

In addition, since a human driver who communicates with a pedestrian is not on board an autonomous vehicle, research is being conducted on a technology for communicating between the vehicle and the pedestrian using an information interface. For example, a technique has been proposed in which images of characters and facial expressions are displayed by mounting a display on a vehicle body surface of an autonomous vehicle, or by irradiating a road surface with light from a projector provided in an autonomous vehicle.

Further, for example, Patent Document 1 and Patent Document 2 describe systems capable of displaying information on the floor, in particular, systems in which a projector is installed at an elevator landing to display guidance information on a wall, a door, a floor, or the like.

PRIOR ART DOCUMENT

Patent Document

[Patent Document 1]
Japanese Unexamined Patent Application, First Publication No. 2018-70377
[Patent Document 2]
PCT International Publication No. WO 2018/078681

SUMMARY OF INVENTION

Problems to be Solved by the Invention

However, when calling attention using sounds such as horns, in an environment where autonomous vehicles are widespread, many autonomous vehicles will travel while generating alert sounds, which are ineffective and causing noisy environment that is not preferable in the city.

In addition, in the method of displaying information on the road surface by the projector of the autonomous vehicle, the main thing is to inform people of the state of autonomous vehicles and to communicate between road crossers and vehicles, and it does not encourage coordination between pedestrians in a crowded environment. In addition, each autonomous vehicle needs to have a function of displaying information on the road surface.

Further, Patent Documents 1 and 2 are used at the elevator platform, not in the space where the pedestrian vehicle exists.

The present invention has been made in view of such circumstances, and an object of the present invention is to provide an information display system and an information display method capable of promoting cooperation between pedestrians and vehicles while reducing the amount of generated noise.

Means for Solving the Problems

In order to solve the above-mentioned problems, one aspect of the present invention is an information display system that includes: a status determination unit that acquires a distribution status based on a detection result of a position of an object to be avoided in a target area; a route generation unit that generates a scheduled route on which a vehicle can travel based on the detected distribution status; and a floor display device that displays the scheduled route on a floor of the target area.

Further, one aspect of the present invention is an information display method that includes: acquiring, by a status determination unit, a distribution status based on a detection result of a position of an object to be avoided in a target area; generating, by a route generation unit, a scheduled route on which a vehicle can travel based on the detected distribution status; and displaying, by a floor display device, the scheduled route on a floor of the target area.

Advantageous Effects of the Invention

As described above, according to the present invention, it is possible to promote cooperation between an autonomous vehicle and a person while suppressing influence on the noisy environment. Further, even if the autonomous vehicle is not equipped with a function of displaying information on the road surface by a projector, it is possible to promote cooperation between the autonomous vehicle and a person by using the information displayed on the road surface.

EMBODIMENTS FOR CARRYING OUT THE INVENTION

Hereinafter, the information display system according to the embodiment of the present invention will be described with reference to the drawings.

Figure 1A:
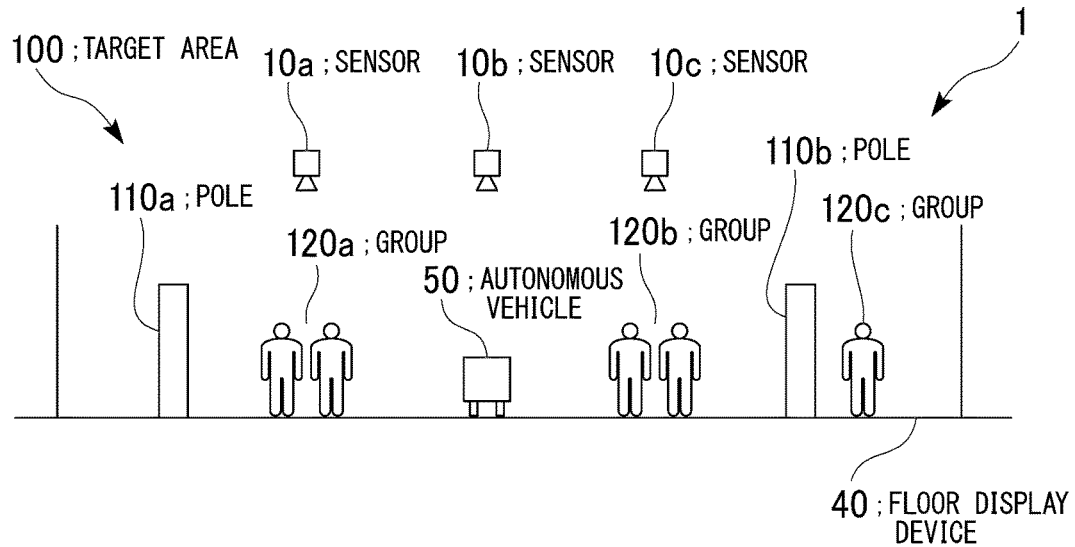
FIG. 1A is a conceptual diagram of a space in which the information display system 1 is used as viewed from the horizontal direction.
Figure 1B:
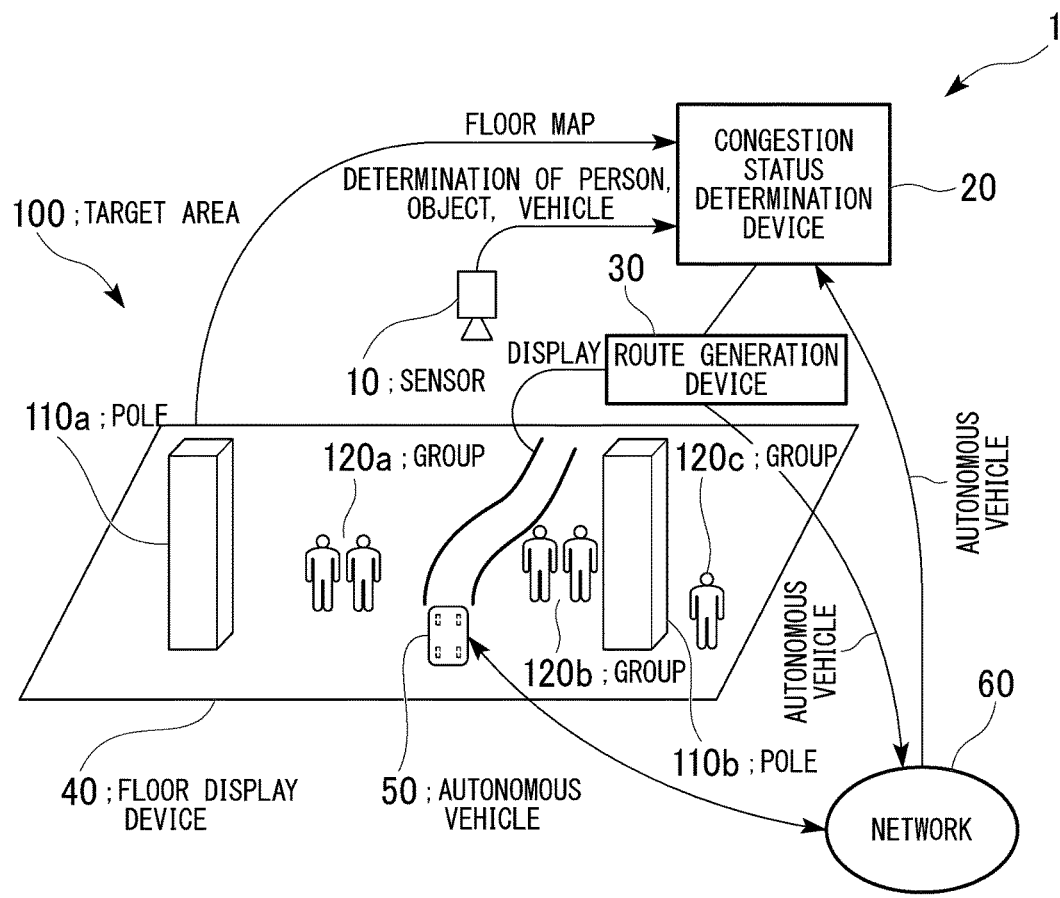
FIG. 1B is a conceptual diagram showing a bird's-eye view of the space in which the information display system 1 is used.

FIGS. 1A and 1B are diagrams showing a configuration of an information display system according to an embodiment of the present invention. FIG. 1A is a conceptual diagram of the status of the space in which the information display system 1 is used as viewed from the horizontal direction. FIG. 1B is a conceptual diagram showing a bird's-eye view of the space in which the information display system 1 is used.

The information display system 1 includes a plurality of sensors 10, a congestion status determination device 20, a route generation device 30, a floor display device 40, an autonomous vehicle 50, and a network 60.

The sensor 10 detects structures such as walls, floors, and poles in the target area 100 and detects the movement of a group (or person), an autonomous vehicle 50, or the like, thereby detecting the position of the group or the autonomous vehicle 50 in the target area 100. For example, the sensor 10 can use a camera that captures the target area from above or a 3D scanner, and can be installed on the ceiling or wall of the target area 100.

Here, the target area 100 may be arranged so that the target area 100 can be detected as a whole by a plurality of sensors 10, such as the sensor 10a, the sensor 10b, and the sensor 10c. Hereinafter, when the sensor 10a, the sensor 10b, and the sensor 10c are not particularly identified, they are simply referred to as the sensor 10.

The target area 100 is an area to be monitored when displaying various signals by the floor display device 40, and is, for example, an underground pedestrian space, a building, a sidewalk, a road in which pedestrians are not separated, and the like.

In the target area 100, there are a plurality of poles 110 (here, poles 110a and 110b). Such a pole 110 is provided between the floor and the ceiling surface.

Further, a person or an autonomous vehicle 50 can pass through the target area 100. In this figure, as an example, the case where the group 120a, the group 120b, and the group 120c, which are a group of passersby, is passing is illustrated.

The congestion status determination device 20 acquires the distribution status based on the result of detecting the position of the object to be avoided existing in the target area 100. The congestion status determination device 20 grasps the distribution of congestion of people, goods, and vehicles in the entire space in real time by associating the information obtained from the sensor 10 with the floor map. The object to be avoided referred to here is an object that does not interfere with the autonomous vehicle 50 when traveling, and is, for example, a person, an obstacle (for example, a wall, a pole, a door, temporarily or permanently placed furniture, luggage, etc.), autonomous vehicles (other autonomous vehicles), etc. The floor map is information showing the structure of the floor which is the target area 100, and is map information showing the positions of walls and poles, the entrances and exits of the target area 100, and the positions of the entrances and exits of shops. The congestion status determination device 20 maps the positions of the group and the autonomous vehicle 50 detected by the sensor 10 to the floor map, so that it is specified at which position in the target area 100 the group or the autonomous vehicle 50 exists.

The route generation device 30 generates a scheduled route on which the vehicle can travel based on the detected distribution status.

In a case where there are a plurality of vehicles in the target area, the route generation device 30 determines whether or not the vehicles interfere with each other when the vehicles move along the scheduled route of each vehicle. When there is an interference, the route generation device 30 determines a route that does not interfere. When there is an interference, the route generation device 30 generates a wait time for any vehicle that is interfering. When the degree of change in the congestion status is more than a certain level, the route generation device 30 regenerates the scheduled route so as to avoid the congested area. When the congestion status determination device 20 detects that a person has entered the scheduled route, the route generation device 30 makes the floor display device 40 display a warning. When the congestion status determination device 20 detects that the person does not exit from the scheduled route when the person enters the scheduled route, the route generation device 30 regenerates the scheduled route. The route generation device 30 notifies the vehicle of the generated scheduled route.

The route generation device 30 determines a gap through which the autonomous vehicle can pass between a group of people or objects based on the distribution status by the congestion status determination device 20, determines a scheduled route through which the autonomous vehicle 50 can pass based on the gap, and displays a signal on the floor.

Figure 3:
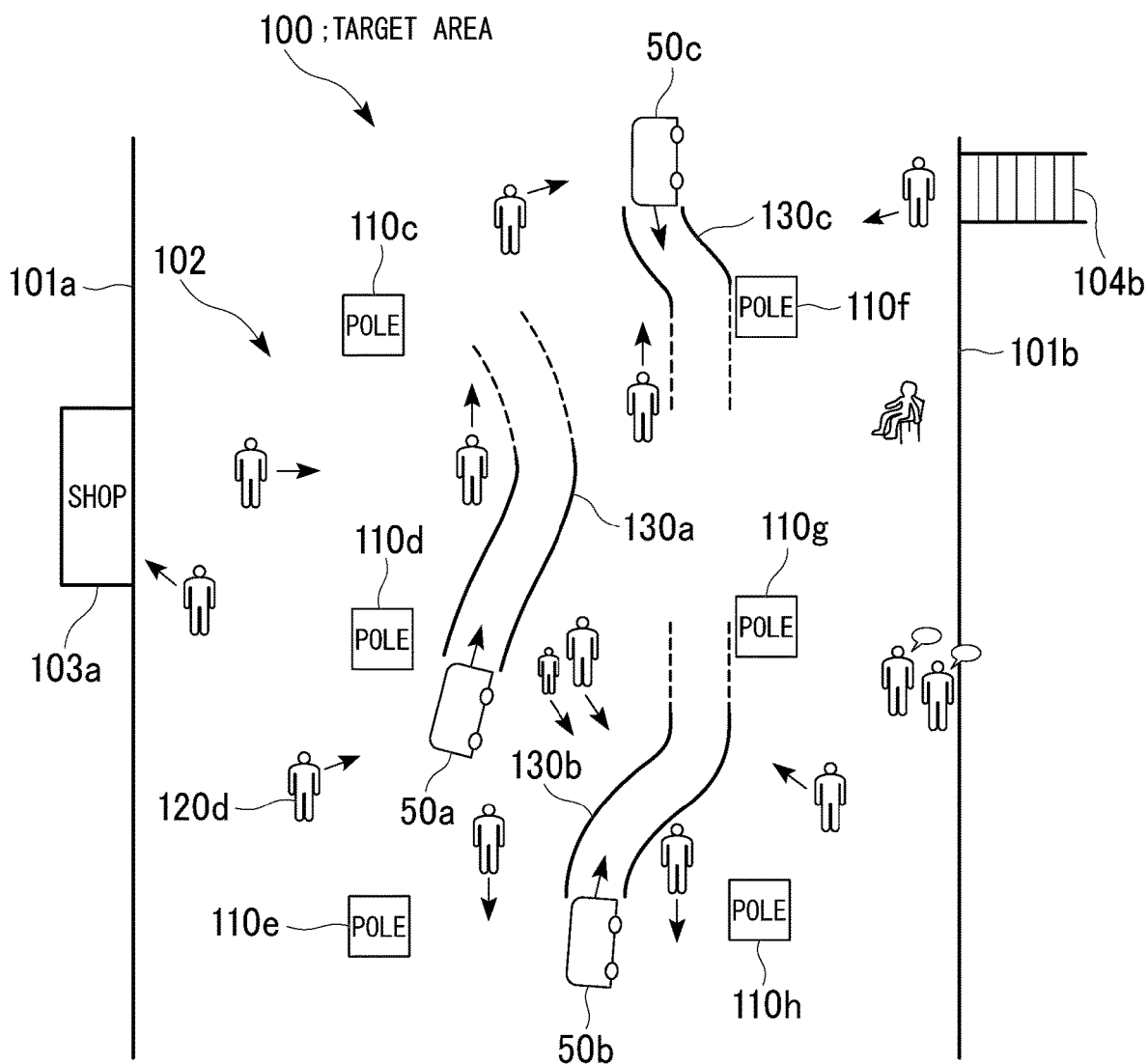
FIG. 3 is a conceptual diagram showing a status of a target area 100.

In FIG. 3, the target area 100 has an area 102 between the wall 101a and the wall 101b through which a person or an autonomous vehicle 50 can pass. On the side of the wall 101a opposite to the area 102, there is a shop 103a where people can enter and exit, and on the side of the wall 101b opposite to the area 102, there is an entrance 104b where people can enter and exit the area 102. The area 102 includes poles 110c, 110d, 110e, 110f, 110g, and 110h. Further, in this figure, a plurality of groups of one or a plurality of people are shown (for example, a group of 120d), and a plurality of autonomous vehicles 50a, 50b, and 50c are shown. The arrows in the vicinity of each person and the autonomous vehicle indicate the direction of travel, and the length of the arrow indicates the moving speed. The longer the length, the faster the moving speed.

Here, the scheduled route 130a is displayed for the autonomous vehicle 50a, the scheduled route 130b is displayed for the autonomous vehicle 50b, and the scheduled route 130c is displayed for the autonomous vehicle 50c.

In this way, in a space that has a specific spread and is expected to be congested (for example, an underground pedestrian space), even when pedestrians are mixed, by having the information display function in the space itself (floor) and linking the information display function with the autonomous vehicle, it is possible to provide a signal display system for promoting smooth movement between an autonomous vehicle and a plurality of pedestrians.

In addition, by using the floor display function, it is possible to separate pedestrians according to the congestion status, and it is possible to alert pedestrians.

Returning to FIG. 1B, the route generation device 30 can also estimate the change in the congestion distribution after t seconds based on the moving direction and speed of a person or an object, and generate a scheduled route according to the estimation result.

Further, the route generation device 30 feeds back the scheduled route to the autonomous vehicle. By detecting the congestion status of the target area 100 by the sensor 10 and transmitting the planned travel route from the route generation device 30 to the autonomous vehicle 50 based on the congestion status, the congestion status determination device 20, the route generation device 30, and the autonomous vehicle 50 can always share information with each other. When a status change occurs in the target area 100, the autonomous vehicle 50 controls the operation based on the change, and the route generation device 30 changes the display of the floor surface display device 40. The autonomous vehicle 50 preferentially moves on the scheduled route set by the route generation device 30 unless a large change in the status occurs.

The floor display device 40 has an information display function in which the floor functions as a display, and by displaying the scheduled route of the autonomous vehicle 50 on the floor corresponding to the current position of the autonomous vehicle 50 in the target area 100, dynamic pedestrian separation can be performed in real time. In a case where the congestion status determination device 20 detects that a person has entered the scheduled route, when the route generation device 30 detects that the displayed route has been violated, the floor display device 40 displays a warning at a position on the floor (for example, a foot portion) corresponding to the current position of a person who has entered the scheduled route.

As the floor display device 40, for example, a floor display device on which a vehicle can be placed or traveled on the floor can be applied. The display may be a liquid crystal display, a plasma display, an organic EL display, or the like.

By displaying the scheduled route on the floor, surrounding pedestrians can recognize the display as a signal.

The autonomous vehicle 50 has a sensor that measures the direction of an obstacle and the distance to the obstacle around itself, and travels while grasping the surrounding status that it has grasped. Further, the autonomous vehicle 50 transmits its own control information to the congestion status determination device 20 in real time via the network 60. Not that the autonomous vehicle 50 updates/changes the planned traveling route at any time only by the information obtained by the sensor of the own vehicle. Instead, by coordinating the congestion status determination device 20 with the autonomous vehicle 50, the route generation device 30 determines the route considered to be the most efficient in the entire space (target area 100). The autonomous vehicle 50 travels based on a scheduled route obtained from the route generation device 30.

Although only one autonomous vehicle 50 is shown in this figure, a plurality of autonomous vehicles 50 may exist in the target area 100.

The network 60 is an information network that is communicably connected between the sensor 10, the congestion status determination device 20, the route generation device 30, the autonomous vehicle 50, and the like.

Figure 2:
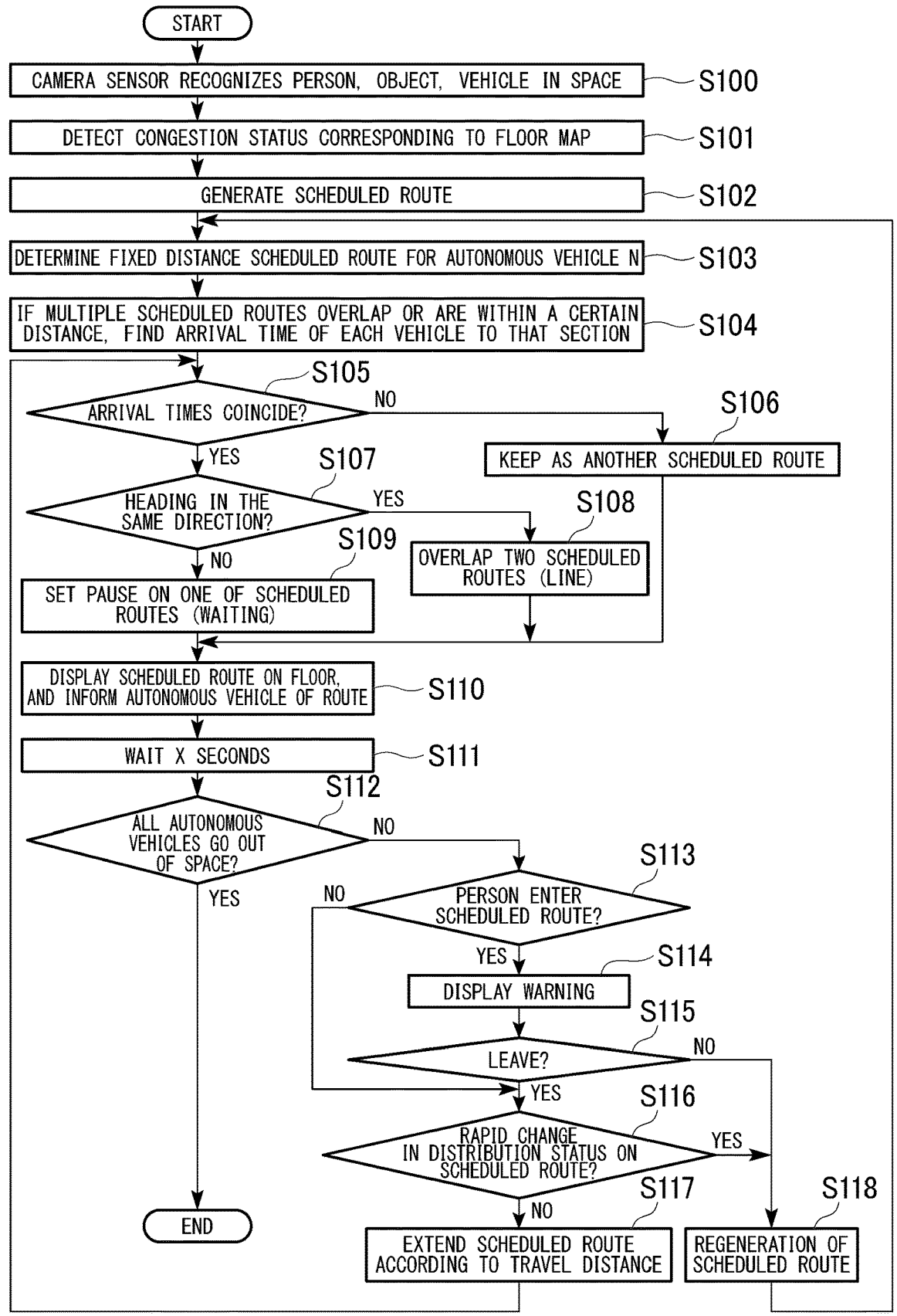
FIG. 2 is a flowchart showing the operation of the information display system 1.

Next, the operation of the above-mentioned information display system 1 will be described with reference to FIGS. 2 to 6. FIG. 2 is a flowchart for explaining the operation of the information display system 1, and FIGS. 3 to 6 are conceptual diagrams showing the status of the target area 100.

The sensor 10 recognizes a person, an object, an autonomous vehicle 50, or the like in the target area 100 (step S100).

The congestion status determination device 20 generates data indicating the distribution status in which the recognition result obtained from the sensor 10 is associated with the floor map, and detects the congestion status representing the congestion distribution in the entire target area 100 (step S101).

The route generation device 30 generates a scheduled route for the autonomous vehicle 50 based on the generated distribution state (step S102). Here, when a plurality of autonomous vehicles 50 exist in the target area 100, a scheduled route is generated for each of them.

Next, the route generation device 30 targets the scheduled route assigned to one autonomous vehicle n out of one or a plurality of autonomous vehicles 50 and sets the scheduled route for a certain distance from the current position with the others (step S103).

When multiple scheduled routes overlap (interfere with other scheduled routes) or other scheduled routes are within a certain distance based on the planned route of the autonomous vehicle n, the route generation device 30 obtains the arrival time of each autonomous vehicle 50 to the section (step S104).

Then, the route generation device 30 determines whether or not the obtained arrival times collide with each other (step S105).

The route generation device 30 holds the information by storing it as another scheduled route if the requested arrival time does not collide (step S106).

On the other hand, when the obtained arrival times collide, the route generation device 30 determines whether or not the scheduled routes colliding with the arrival times are oriented in the same direction (step S107). When facing the same direction, the route generation unit 30 overlaps the two scheduled routes (step S108). For example, when the traveling direction of the other autonomous vehicle 50 is included in a certain range of the traveling direction of the one autonomous vehicle 50, a scheduled route is generated so that the other autonomous vehicle 50 follows the one autonomous vehicle 50. As a result, the autonomous vehicle 50 can travel without colliding with the autonomous vehicle 50. The route generation device 30 then generates different scheduled routes for one autonomous vehicle 50 and the other autonomous vehicle 50 according to the destination.

On the other hand, when the route generation device 30 does not face the same direction, a waiting period (a period for pausing or decelerating) is provided for one of the scheduled routes (step S109). As a result, it is possible to prevent the autonomous vehicle 50 from colliding with the vehicle.

The route generation device 30 transmits data indicating the scheduled route to the floor display device 40 in the target area 100 based on the generated scheduled route. Here, since the current position of each autonomous vehicle 50 can be detected by the sensor 10, image data for displaying the scheduled route based on the current position on the floor display device 40 may be transmitted. Further, the route generation device 30 transmits the generated scheduled route to the generated target autonomous vehicle 50 via the network 60 (step S110). The floor display device 40 displays the scheduled route on the floor according to the data indicating the scheduled route received from the route generation device 30. Here, the scheduled route within a certain distance range from the current position of the autonomous vehicle 50 to the traveling direction is displayed according to the current position of the autonomous vehicle 50.

Next, the route generation device 30 acquires the distribution status based on the recognition result of the sensor 10 after the wait time of x seconds has elapsed (step S111), acquires the distribution status based on the recognition result of the sensor 10, and determines whether or not all the autonomous vehicles 50 have exited from the target area 100 (step S112). If it is determined that all the autonomous vehicles 50 have exited, the route generation device 30 ends the process.

On the other hand, if it is determined that all the autonomous vehicles 50 have not exited, the route generation device 30 determines whether or not a person has entered the scheduled route (step S113). The route generation device 30 causes the floor display device 40 to display a warning when a person is entering the scheduled route based on the status distribution according to the recognition result obtained from the sensor 10 (step S114). For example, a message such as "The vehicle is about to pass. Please be careful," is displayed on the floor by the floor display device 40 around the person who is detected to be in the area. By seeing this message, a person who has entered the scheduled route can move out of the displayed scheduled route by recognizing that the autonomous vehicle 50 is in the area where the vehicle is scheduled to pass.

The route generation device 30 determines whether or not a person who has entered the scheduled route has exited (step S115). If the person does not exit, the route that bypasses the person is regenerated as a scheduled route (step S118), and then the process proceeds to step S103.

On the other hand, when the person who has entered the scheduled route exits, the route generation device 30 determines whether or not there has been a sudden change in the distribution status on the scheduled route (step S116). For example, when a large number of people suddenly enter the target area 100, or when the moving speed of the people in the target area 100 suddenly increases (for example, when they start running), there are cases where the traveling direction of a person in the target area 100 is significantly changed. The determination whether or not there has been a sudden change in the distribution status may be performed by, for example, comparing the distribution status at the time of determination with the distribution status before a certain time t1 seconds, and based on whether or not there is a change of a certain amount or more with respect to the degree of congestion, the moving speed of a person, the moving direction, and the like.

The route generation device 30 regenerates the scheduled route when there is a sudden change in the distribution status (step S118). Here, a scheduled route through which the autonomous vehicle 50 can pass is generated based on a gap through which the autonomous vehicle 50 can pass according to the distribution state after the change occurs.

On the other hand, if there is no sudden change in the distribution status, the route generation device 30 extends the scheduled route according to a travel distance (step S117). For example, the route generation device 30 obtains a travel distance of the vehicle targeted to extend the scheduled route from the difference between the position measured last time by the sensor 10 and the position measured this time and extends the current scheduled route by a distance similar to the travel distance thereof. After that, the process proceeds to step S105.

When the scheduled route is displayed in step S110 of the flowchart of FIG. 2 described above, as shown in FIG. 3, the route generation device 30 determines a gap through which the autonomous vehicle 50 can pass between a group of people or objects based on the distribution status of the congestion status determination device 20, determines a scheduled route through which the autonomous vehicle 50 can pass based on the gap and transmits data indicating the scheduled route to the floor display device 40. The floor display device 40 displays signals (scheduled route 130*a*, scheduled route 130*b*, scheduled route 130*c*) on the floor based on the data indicating the scheduled route received from the route generation device 30.

For example, when a reference distance is the distance in the width direction in which the autonomous vehicle 50 can travel with a margin and moving objects are separated by this reference distance (a gap of about one person or several persons), the determination of the gap is performed by recognizing the outline of the group based on the gap and determining these to be different groups. Further, when the autonomous vehicle 50 is closer than the distance in the width direction in which the autonomous vehicle 50 can travel with a margin, those objects are included in the group (determined as one group). Here, in a case where there is a gap between objects at a narrower interval than is considered to be the boundary of the group (a gap narrower than the reference distance but within a certain difference from the reference distance), the gap can be a candidate for a scheduled route as a place where a gap may open up to the reference distance. Then, depending on the status in the target area 100, the scheduled route that has been the candidate may be applied and set as the scheduled route of the autonomous vehicle 50.

Figure 4:
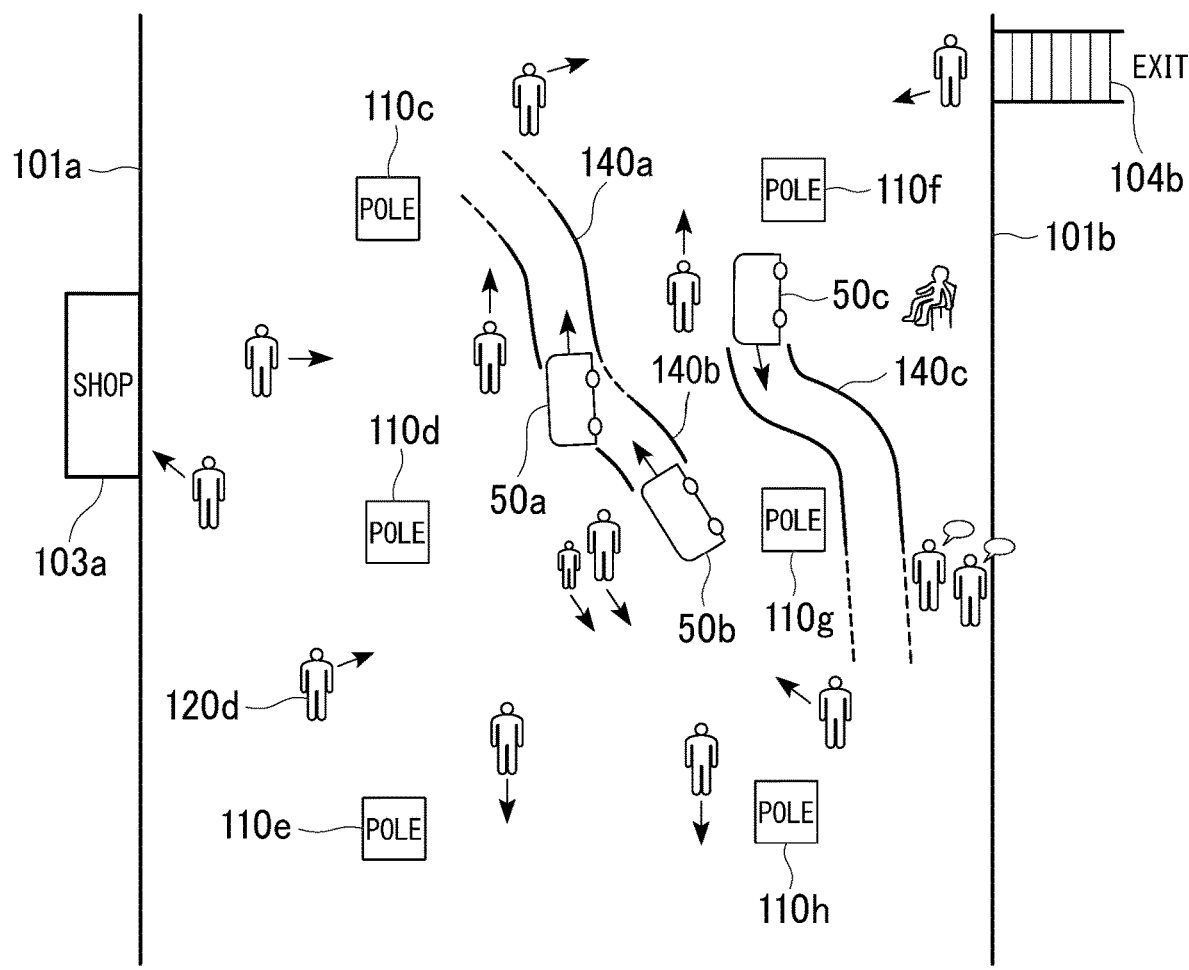
FIG. 4 is a conceptual diagram showing a status of a target area 100.

Further, in a case where the route generation device 30 generates the scheduled route so as to overlap the two scheduled routes in step S108, when there are multiple autonomous vehicles heading in the same direction as shown in FIG. 4, in order to use space efficiently and reduce the possibility of re-changing the route and the possibility of collisions, a plurality of autonomous vehicles may be formed in a platoon to unify the scheduled routes.

Here, the scheduled route 140*b* of the autonomous vehicle 50*b* is generated and displayed so as to follow the scheduled route 140*a* of the autonomous vehicle 50*a*. On the other hand, since the traveling directions of the autonomous vehicle 50*c* and the autonomous vehicle 50*a* are different, the scheduled route 140*c* of the autonomous vehicle 50*c* does not follow the scheduled route 140*a* and the scheduled route 140*b* of the autonomous vehicles 50*a* and 50*b*, and an independent scheduled route 140*c* is generated and displayed.

Figure 5:
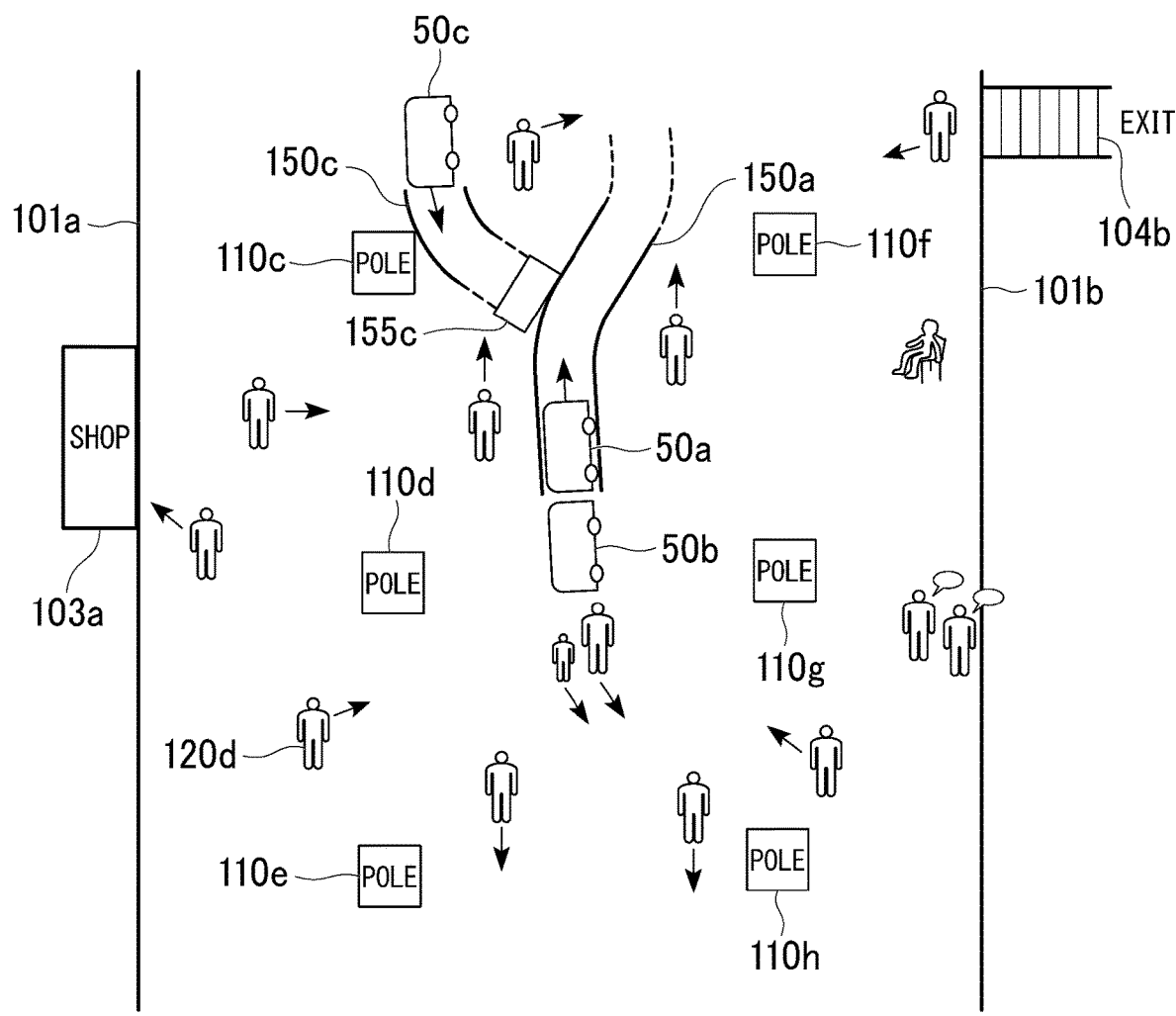
FIG. 5 is a conceptual diagram showing a status of a target area 100.

Further, when the congestion is overcrowded or when the timings of movement of people, objects, and vehicles overlap, by providing a temporary stop on one of the scheduled routes in step S109, when one of the vehicles temporarily stops as shown in FIG. 5, the route generation device 30 generates a scheduled route that gives way. For example, the position for pausing on the scheduled route 150*c* is any position before the autonomous vehicle 50*c* reaches the scheduled route 150*a* of the autonomous vehicles 50*a* and 50*b*. Based on this scheduled route, in some cases, the floor display device 40 displays a warning (reference numeral 155*c*) in advance at an expected point where the vehicle will temporarily stop. As a result, it is possible to urge people from entering the temporarily stopped area, and the autonomous vehicle 50*c* can give way to the autonomous vehicle 50*a* and the autonomous vehicle 50*b*.

Figure 6:
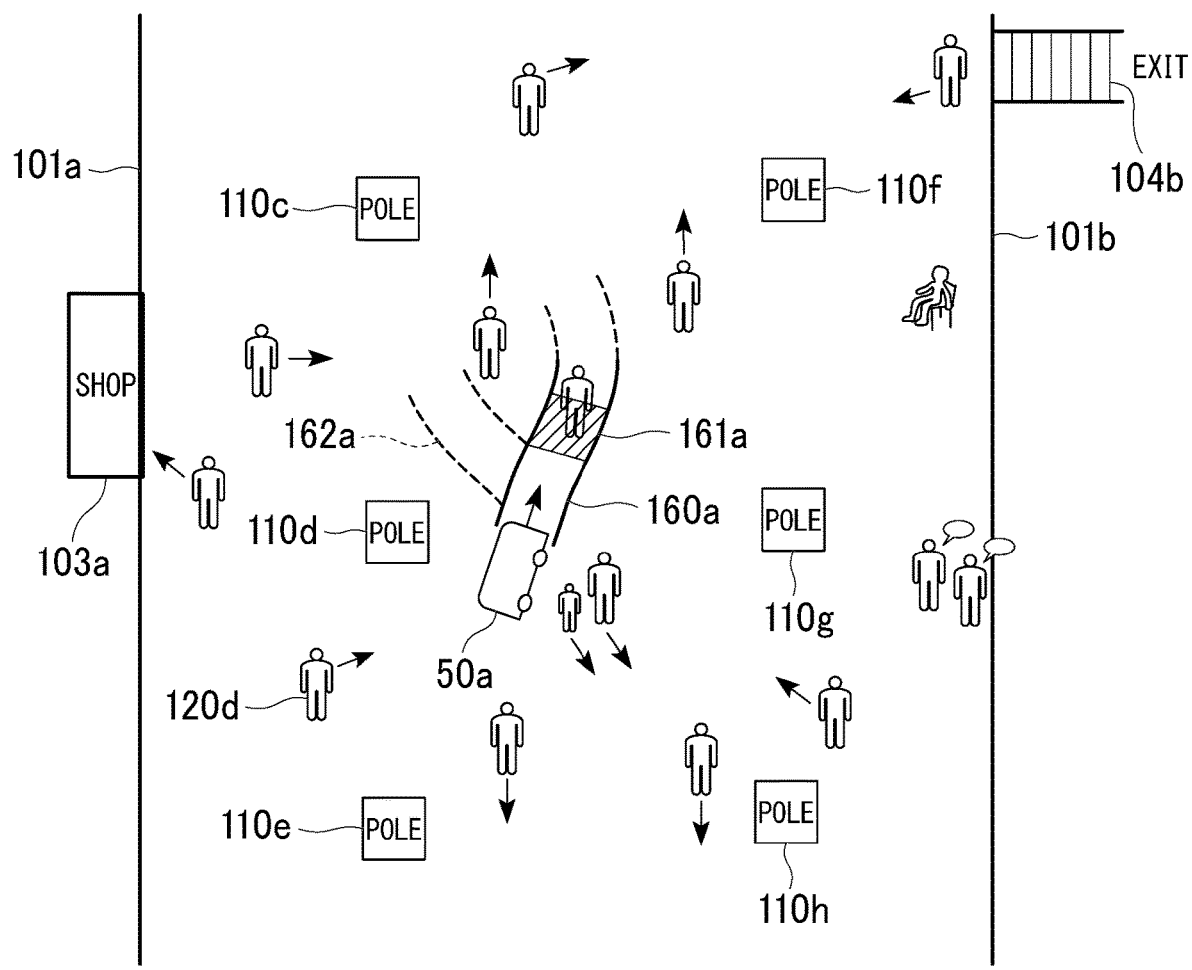
FIG. 6 is a conceptual diagram showing a status of a target area 100.

In addition, if there is a conflict between the route on which the vehicle is scheduled to travel and the direction in which the person wants to move, the person may enter or cross the route. In such a case, in step S114, as shown in FIG. 6, the route generation device 30 displays a warning (reference numeral 161*a*) at a position where a conflict occurs in the scheduled route 160*a*. This can encourage a person to exit immediately. Further, if sufficient time is required to reach the point and an alternative route can be generated, the route generation device 30 can switch the display to the alternative route (reference numeral 162*a*). If sufficient time is not available, the status of the autonomous vehicle is judged, and stop/avoidance is controlled, and the floor display is performed based on the information.

Figure 7:
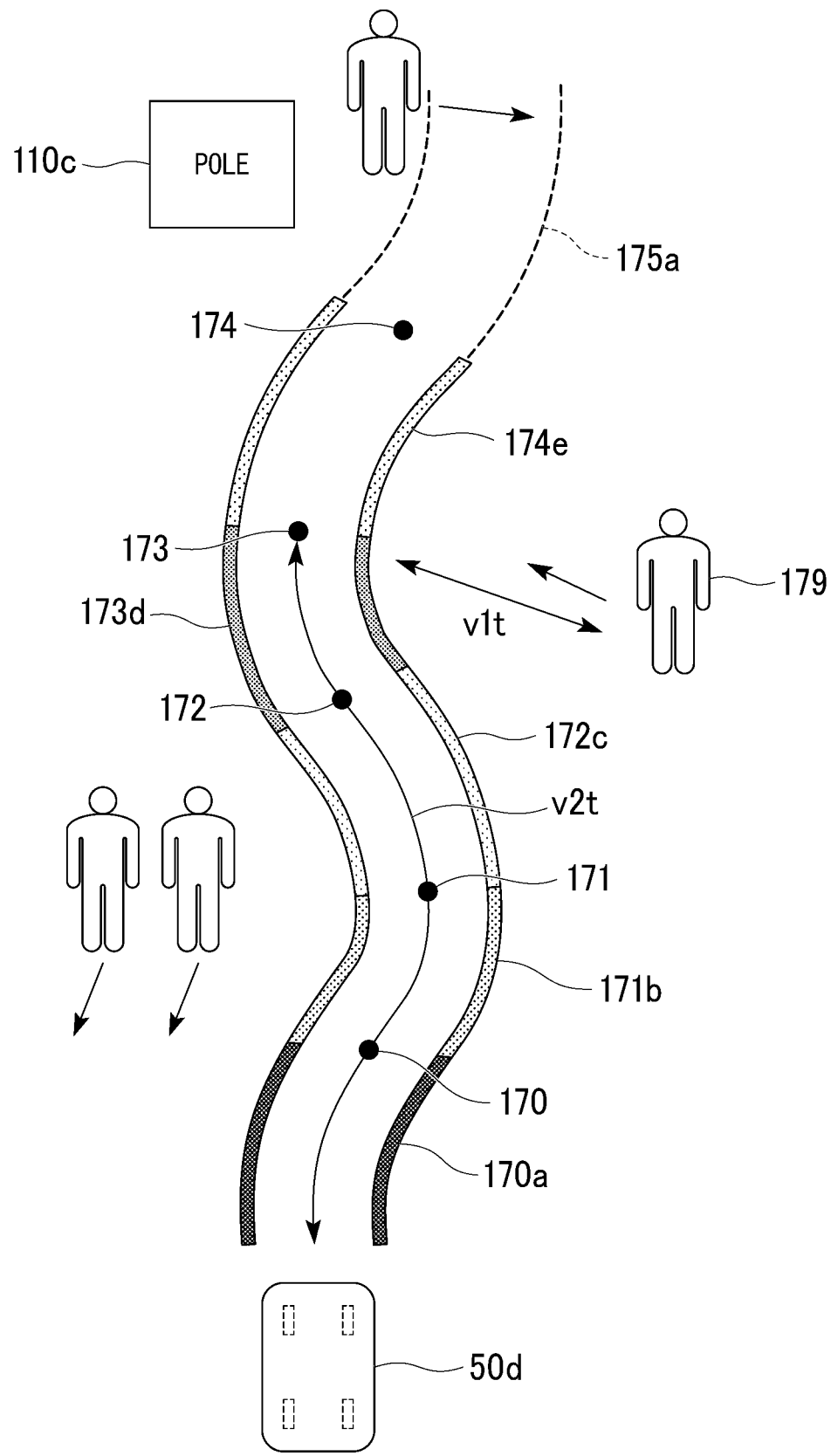
FIG. 7 is a diagram showing an example of a display mode of the floor display device 40.

In the above-described embodiment, the floor display device 40 may display the scheduled route in a different display mode depending on the scheduled time from the starting point to the passing point in the scheduled route. For example, as shown in FIG. 7, depending on the length of the arrival time to each passing point (reference numeral 170, reference numeral 171, reference numeral 172, reference numeral 173, and reference numeral 174) on the scheduled route of the autonomous vehicle 50*d*, the floor display device 40 may display colors, line types, and the like in different display modes (reference numeral 170*a*, reference numeral 171*b*, reference numeral 172*c*, reference numeral 173*d*, and reference numeral 174*e*). For example, the distance from the current position of the autonomous vehicle 50*d* to the passing point indicated by reference numeral 173 is obtained by "speed v2 (speed of autonomous vehicle 50*d*)×time t (estimated time to reach the passing point indicated by reference numeral 173 from the current position)". Further, the distance traveled by the time t of the person 179 moving at the speed v1 can be obtained by v1×t, and from this distance and the traveling direction of the person 179, the scheduled route of the autonomous vehicle 50*d* may be obtained so that the person 179 does not interfere with the vehicle.

In addition, as the distance from the current position of the autonomous vehicle 50*d* increases on the scheduled route, the possibility of changing the route due to changes in the status increases. Therefore, the degree of determination of the route may be expressed by changing the type of the line to a display mode such as a dotted line or changing the transparency of the line (reference numeral 175*a*).

According to the above-described embodiment, the optimum route can be performed for the autonomous vehicle and the pedestrian in consideration of the congestion status of the entire space. Further, even when the autonomous vehicle comes from behind the pedestrian, the floor display function can be used to display a warning for notifying the presence of the vehicle to the area in the traveling direction of the pedestrian. As a result, even if there is an autonomous vehicle 50 that should be noted when it is not in the pedestrian's field of view, a warning can be displayed within the range of the pedestrian's field of view by using the floor display function.

In the above-described embodiment, in a case where a route is generated in the initial step (for example, step S102), when people are overcrowded in the traveling direction of the autonomous vehicle 50 (for example, a group is fully lined up from the wall 101*a* to the wall 101*b*) and no gap can be found, the route generation device 30 may generate a route assuming a location where the gap may open. For example, when the traveling directions of the autonomous vehicle 50 and the group are the same, the autonomous vehicle 50 follows behind the group, and for the feet of the group which are on the front side of the autonomous vehicle 50 in the traveling direction, a warning display may be made to warn that the autonomous vehicle 50 is approaching from behind. As a result, some people in the group who visually recognize the warning display make a gap, so that the autonomous vehicle 50 can set the gap as the scheduled route and proceed to the front side of the group. Further, when the traveling direction of the autonomous vehicle 50 and the group are opposite to each other or the group is staying, as described above, a temporary stop or a warning display is performed to urge the vehicle to make a clear route. As a result, some people in the group who visually recognize the warning display make a gap, so that the autonomous vehicle 50 can set the gap as the scheduled route and proceed while avoiding the group.

In the above-described embodiment, the case where the floor display device uses a display has been described, but various information such as a scheduled route and warning information may be projected on the floor by using a projector or the like installed above the floor.

The congestion status determination device 20 or the route generation device 30 in the above-described embodiment may be realized by a computer. In that case, the program for realizing this function may be recorded on a computer-readable recording medium, and the program recorded on the recording medium may be read by the computer system and executed. The term "computer system" as used herein includes hardware such as an OS and peripheral devices. Further, the "computer-readable recording medium" refers to a portable medium such as a flexible disk, a magneto-optical disk, a ROM, or a CD-ROM, or a storage device such as a hard disk built in a computer system. Further, a "computer-readable recording medium" may also include those that dynamically hold programs for a short period of time, like a communication line when a program is transmitted via a network such as the Internet or a communication line such as a telephone line, and those that hold the program for a certain period of time, like the volatile memory inside a computer system that serves as a server or client in that case. Further, the above program may be for realizing a part of the above-mentioned functions. Furthermore, the above-mentioned functions may be realized in combination with a program already recorded in the computer system, and may be realized by using a programmable logic device such as FPGA (Field Programmable Gate Array).

Although the embodiments of the present invention have been described in detail with reference to the drawings, the specific configuration is not limited to this embodiment, and includes designs and the like within a range that does not deviate from the gist of the present invention.

INDUSTRIAL APPLICABILITY

The present invention can be widely applied to information display systems and information display methods, and makes it possible to promote cooperation between pedestrians and vehicles while suppressing influence on the noisy environment.

The invention claimed is:

1. An information display system comprising:
a status determination device located outside a plurality of vehicles, the status determination device being configured to acquire a distribution status based on a detection result of positions of a plurality of objects to be avoided in a target area, the plurality of objects including one or more obstacles, one or more vehicles, one or more persons, one or more groups of persons, or one or more combinations thereof, the distribution status of the plurality of objects capable of varying based on movement of the objects in the target area;
a route generation device located outside the plurality of vehicles, the route generation device being configured to determine a gap between the plurality of objects through which a vehicle is capable of passing based on the distribution status of the plurality of objects as acquired for each of the vehicles, the route generation device further configured to generate a scheduled route on which the vehicle is capable of traveling based on the gap between the plurality of objects as determined for each of the vehicles so as to avoid interference between the vehicles and/or the objects;

a device located outside the plurality of vehicles, the device being configured to display scheduled routes of the vehicles on a floor of the target area, wherein in a case where the status determination device detects that a person has entered the scheduled route and the route generation device detects that the scheduled route as displayed has been violated, the device displays a warning at a position on the floor corresponding to a current position of the person who has entered the scheduled route; and wherein the device is a display forming a part of the floor of the target area and the route generation device is further configured to transmit data indicating the scheduled routes to the device in the target area based on generated scheduled routes.

2. The information display system according to claim 1, wherein,
in a case where there is a plurality of vehicles in the target area, the route generation device is further configured to determine whether or not the vehicles interfere with each other when the vehicles move along the scheduled route of each vehicle, and
when the vehicles interfere with each other, the route generation device is configured to generate a route in which an interference does not occur.

3. The information display system according to claim 2, wherein,
when the vehicles interfere with each other, the route generation device is further configured to generate a wait time for at least one of the vehicles in which the interference is occurring.

4. The information display system according to claim 1, wherein,
in a case where a degree of change in a congestion status of a congested area is more than a certain level, the route generation device is configured to regenerate the scheduled route so as to avoid the congested area.

5. The information display system according to claim 1, wherein the route generation device is further configured to notify the vehicle of the scheduled route as generated.

6. An information display method comprising:
acquiring, by a status determination device located outside a plurality of vehicles, a distribution status based on a detection result of positions of a plurality of objects to be avoided in a target area, the plurality of objects including one or more obstacles, one or more vehicles, one or more persons, one or more groups of persons, or one or more combinations thereof, the distribution status of the plurality of objects capable of varying based on movement of the objects in the target area;

determining, by a route generation device located outside the plurality of vehicles, a gap between the plurality of objects through which a vehicle is capable of passing based on the distribution status of the plurality of objects as acquired for each of the vehicles;

generating, by the route generation device located outside the plurality of vehicles, a scheduled route on which the vehicle is capable of traveling based on the gap between the plurality of objects as determined for each of the vehicles so as to avoid interference between the vehicles and/or the objects;

displaying, by a device located outside the plurality of vehicles, scheduled routes of the vehicles on a floor of the target area, wherein in a case where the status determination device detects that a person has entered the scheduled route and the route generation device detects that the scheduled route as displayed has been violated, the device displays a warning at a position on the floor corresponding to a current position of the person who has entered the scheduled route, and wherein the device is a display forming a part of the floor of the target area, and the route generation device further transmits data indicating the scheduled routes to the device in the target area based on generated scheduled routes.

7. The information display method according to claim 6, wherein the method further comprises,
in a case where there is a plurality of vehicles in the target area, determining, by the route generation device, whether or not the vehicles interfere with each other when the vehicles move along the scheduled route of each vehicle, and
when the vehicles interfere with each other, generating, by the route generation device, a route in which an interference does not occur.

8. The information display method according to claim 7, wherein the method further comprises,
when the vehicles interfere with each other, generating, by the route generation device, a wait time for at least one of the vehicles in which the interference is occurring.

9. The information display method according to claim 6, wherein the method further comprises,
in a case where a degree of change in a congestion status of a congested area is more than a certain level, regenerating, by the route generation device, the scheduled route so as to avoid the congested area.

10. The information display method according to claim 6, wherein the method further comprises notifying, by the route generation device, the vehicle of the scheduled route as generated.

* * * * *